United States Patent Office 2,742,930
Patented Apr. 24, 1956

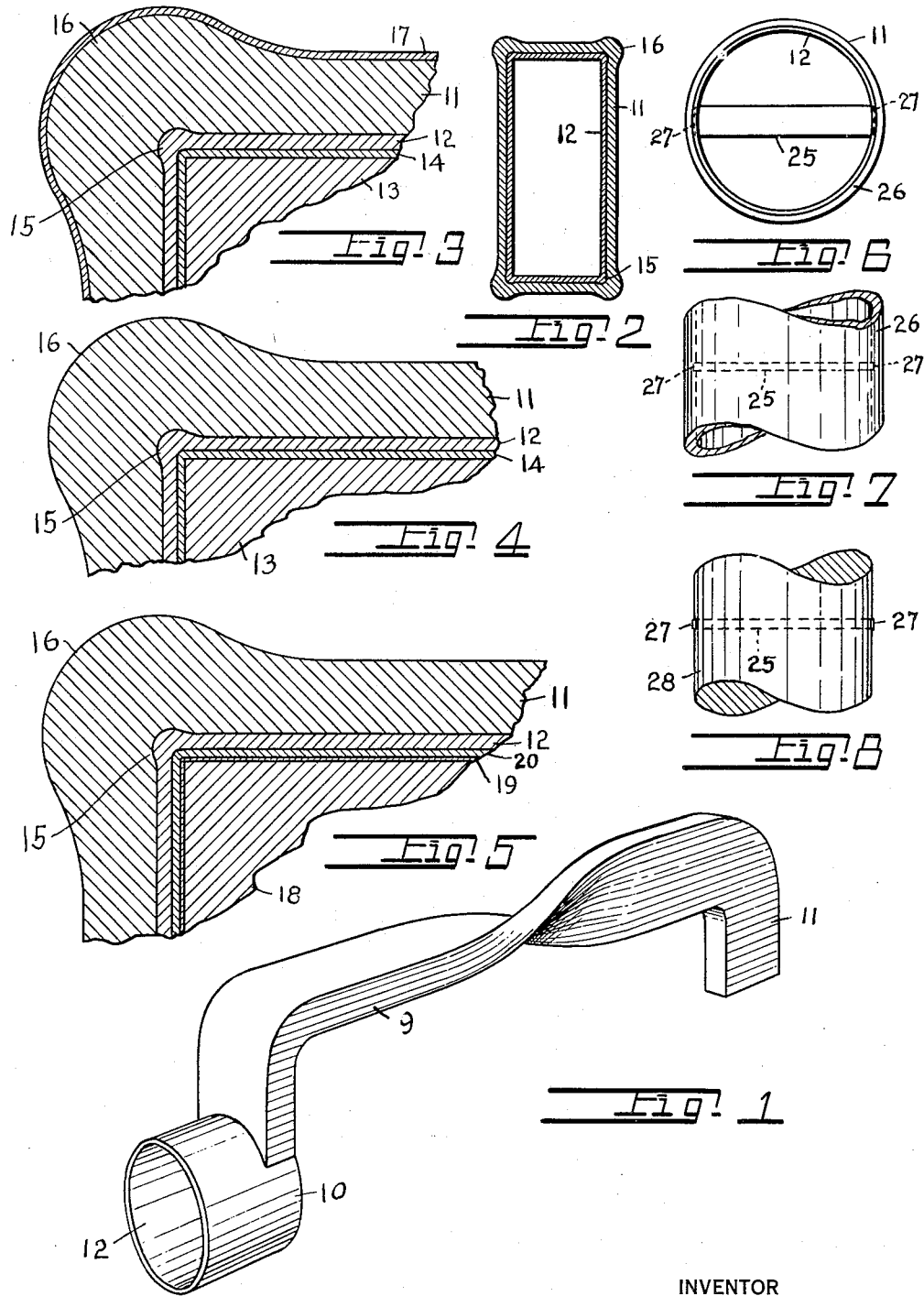

2,742,930

WAVE GUIDE

William B. Stoddard, Jr., Hamilton, Ohio, assignor to The Champion Paper and Fibre Company, Hamilton, Ohio, a corporation of Ohio Original application January 8, 1946, Serial No. 639,871, now Patent No. 2,592,614, dated April 4, 1952. Divided and this application January 23, 1952, Serial No. 268,426

5 Claims. (Cl. 138—62)

This invention relates to tubular wave guides such as are used in radar equipment, and to methods of producing the same. Such wave guides are made of metal and may be either uniform or variable in cross sectional form and dimension. They are frequently long and slender in form and are often required to have curved, twisted, and other more or less irregular shapes. The interior surfaces should be smooth and free from even small projections, lumps, or pits. They are advantageously of high finish and good electrical conductivity and for this reason are commonly specified to be of silver.

Such tubular wave guides have heretofore been produced in various ways and the resulting products have varied in character and quality in accordance with the methods used in their production. Silver clad strips have been spiral wound with the silver on the inside, and silver soldered to form a tube. Alternatively, silver clad metal has been drawn into tubing which is subsequently bent into the desired form. Otherwise tubes have been formed by casting, extrusion, drawing, machining grooves in solid metal and silver soldering the fourth side in place, or by electroforming copper on a graphite coated wax core in a manner similar to the well known method of making electrotypes. Wave guides made by such processes seldom had the desired character of interior surface unless subjected to an interior finishing operation. In tubes of rectangular cross section this surface was sometimes burnished by forcing tightly fitting rollers through the tube. The inside of tubular wave guides made of base metals was commonly coated with a thin layer of silver by chemical or electrochemical precipitation processes. Since it is extremely difficult to deposit significant thicknesses or uniform and continuous layers of silver inside of such tubular bodies, particularly those which have sharp interior angles or which are narrow in cross section or long and slender or irregular in shape, the silver layers applied in practice were ofter imperfect and usually much less in thickness than the 0.0005 inch minimum commonly specified. The bending and twisting required to form tubes into the shapes specified for wave guides has also been a source of considerable difficulty. The maintenance of the cross sectional form and dimensions at the bends has been particularly difficult and the thickness and physical properties of the walls were materially altered by cold bending. The prior processes were not adapted to the production of the required irregular forms in one piece and it has accordingly been necessary to form wave guides in relatively short sections which have then had to be silver soldered or otherwise fastened together. Sharp bends in particular have frequently been made by silver soldering together short sections of straight tubing cut at suitable angles. Soldering processes and the like, however, frequently left frozen droplets of metal on the inside of the tube, seriously impairing the function of the guide. For these and other reasons, wave guides made by the heretofore known processes such as those enumerated, were of high cost or poor quality or both, and uneconomically large percentages had to be rejected for failure to meet the exacting requirements.

Further, I have found that attempts at electroformation, in accordance with known methods, on metallic cores which were subsequently removed by fusion or by solution in chemical reagents, failed to produce objects with the clean, smooth, continuous, highly-finished interior surfaces desired in wave guides, no matter how smooth and highly polished the surface of the core on which deposition was made. It is not known whether this is due to a roughening of the core surface before the initial deposit of metal is formed thereon, or to damage to the inside surface taking place during solution or fusion and removal of the core metal.

One object of the present invention is to provide a tubular metallic wave guide of straight, curved, or twisted form as required, and of uniform or varying cross sectional shape and dimensions, of improved characteristics, of strength and rigidity adequate to resist the vibratory and other stresses to which it may be subjected in use, but without excess weight, which wave guide shall have a smooth continuous uniformly high finished silver lining of appreciable and substantially uniform thickness, which is integral with a wall of stronger and more rigid metal, whole being free from longitudinal seams and joints. An allied object is to provide a relatively low cost method of electrolytically forming such wave guides of the required regular or irregular shapes, by which the desired smooth and highly finished interior surfaces can be provided without the necessity of any polishing operation on the inside of the tubular body, and by which they can be made with substantially uniform wall thickness and produced with a high degree of dimensional accuracy, and by which this accuracy can be repeated to render the parts interchangeable. Other and more detailed objects and advantages of the invention will be made apparent by the following detailed description.

To accomplish these objects I first deposit the metallic lining of the wave guide on a destructible metal core and thereover deposit the metal of the wall structure. I have also found that if a continuous layer of copper is formed over the highly polished surface of the core and is either polished or deposited under conditions to give a bright plate, the copper remains on the inner surface of the wave guide after the removal of the core, and if the copper layer is then dissolved in a strongly ammoniacal solution of divalent copper, the inner surface of the silver lining is left with a smooth high finish which is substantially identical with that originally provided on the surface of the copper layer which formed the base for the electrodeposition of the wave guide lining. The copper layer is advantageously formed by electrodeposition in the known manner, as copper films formed by chemical precipitation are not in general adequate for the present purpose. The term "continuous" as used in the present specification and claims in describing this copper layer, is to be understood to mean not only freedom from gross discontinuities such as unplated areas, but also freedom from any minute or event microscopic discontinuities which might permit reagents used in destruction of the core or the core metal itself during destruction and removal of the core, to penetrate to, or to cause chemical or physical damage to, the highly finished lining of the wave guide. This term, however, is not to be understood to imply that the copper layer is continuous over, or necessarily covers, those parts of the core where no silver wave guide lining is to be deposited (e. g. the ends of the core) which, as specifically set forth hereinafter, need not receive any copper deposit. The term "strongly ammoniacal" is herein used to define solutions in which ammonia is present in excess of the amount required to form the corresponding copper complex and is advantageously at least 3 to 5 times that amount, that is the ammonia (NH₃) is desirably present in an amount at least roughly 3 to 5 times the weight of the divalent copper (Cu⁺⁺). Apparently any of the usual acid radicals may be associated with the ammonia copper complex in the solution. The process of dissolving the copper layer as hereinbefore set forth is, in the present specification and claims, designated as "chemically dissolving" and is to be carefully distinguished from electrolytic or electrochemical processes wherein the solution is accomplished by the application of electrical potential from an external source.

The surface of the core before the formation of the copper layer thereon should be smooth and free from cracks, dents, pinholes, pits, and other surface irregularities. The surface should be, generally, highly polished in order to facilitate the formation thereon of a smooth highly-finished copper layer such as will impart to the innermost surface of the wave guide the smoothness and finish usually specified.

Cores designed to be destroyed by dissolving in chemical reagents, either acids or alkalies, such as cores made of alloys having a zinc, aluminum, or magnesium base, require only to be polished and copper-plated as described. When, on the other hand, it is desired to use cores adapted to be destroyed in situ by fusion, consisting usually of alloys containing considerable proportions of bismuth, it is necessary to prevent the fused core metal from tinning and alloying with the copper layer and thereby interfering with its complete removal from the inner lining of the wave guide. This can be accomplished by treating the fusible core, after polishing and before plating with copper, in a solution characterized by the presence of an acid radical containing a metal chosen from the group consisting of vanadium, chromium, molybdenum, and tungsten, commonly the radical of vanadic, chromic, molybdic, or tungstic acid. This treatment leaves a thin film on the surface of the core, which film is thought to contain a compound of the metal in the acid radical used. This film separates the copper from the fusible core, does not wet with the fused core metal and prevents it from wetting, tinning, or alloying with the copper deposit. Although electrolytic treatments either anodic or cathodic may be preferable when using some fusible alloys, I find that a core composed of metal melting at about 75° C. and containing about 50% bismuth, 35% lead, 9% tin, and 6% cadmium, can be successfully treated, after cleaning, acid dipping, and rinsing, and before copper plating, by dipping the core for about one minute in a solution containing about 25 grams of sodium molybdate per liter, at a temperature between 40° and 50° C. and a pH about 6. The core should then be flashed with cyanide copper and then plated with acid copper till the desired thickness is secured.

In order to secure wave guide structures of the desired strength and rigidity and particularly to combine these properties with the lightness which is desirable for airborne equipment, I have found it desirable to form the body of the wall structure of nickel electrodeposited over the silver lining, since the physical properties of nickel render it particularly suitable for this purpose.

It is also generally desirable to have the nickel wall thickness, as well as that of the silver lining, substantially uniform. For this reason it is desirable during the electroformation of the wave guide, to have the current density as nearly uniform as possible in all parts of the surface. This may be accomplished in the known manner by the shape and location of the anodes and by use of non-conducting baffles and conducting "thieves" in suitable locations, when necessary. Electrodeposition, so controlled, results in greater uniformity of thickness and physical properties than is usually secured in tubes bent or formed into the irregular shapes frequently required for wave guides. In the formation of guides having rectangular cross sections the current density at the edges is normally somewhat greater than that over the flat area of the faces. This results in edges of a slightly greater thickness than the flat surfaces. This is the opposite of the condition where the angle has been formed by cold bending, and makes the structure much less liable to fracture along the edges than are those formed by bending without annealing, and much harder and stronger than annealed structures. By this method of production I have been able to produce wave guides in which the thickness of the silver lining is up to the usual specification of 0.0005 inch, or more if desired, and which is nowhere less than 0.0002 inch, an accomplishment which has often been difficult if not impossible with some of the previously used methods of manufacture.

The invention will be more clearly understood by reference to the accompanying drawing, in which:

Fig. 1 is a perspective view of one form of wave guide illustrating the type of bends, twists, changes in cross sectional form, etc., which are commonly required in wave guides.

Fig. 2 is a typical cross section through the rectangular portion of a wave guide such as illustrated in Fig. 1, the thicknesses of the several layers being exaggerated to show the wall structure more clearly.

Fig. 3 is a fragmentary greatly-enlarged cross section showing one corner of an acid soluble metallic core with all of the layers of electrodeposited metal thereon, and ready for the operation of dissolving the core.

Fig. 4 is a similar fragmentary cross section of a core which is to be dissolved in alkali, together with all of the metallic layers electrodeposited thereon, ready for the operation of dissolving the core in alkali.

Fig. 5 is a similar fragmentary cross sectional view of a fusible metal core with all of the electrodeposited metal thereon, and ready for fusion and removal of the core.

Figs. 6 and 7 are end and side views, respectively, of a fragment of a cylindrical portion of a wave guide with an inwardly extending member formed into the side walls.

Fig. 8 is a fragmentary view of the core used in forming the portion of guide illustrated in Figs. 6 and 7, showing how the inwardly extending member is embedded in the core.

Referring to the drawing, Fig. 1 shows a form such as may be required of a wave guide. It is composed of a portion 9 of rectangular and a portion 10 of circular cross section, the former having one 90-degree twist and two 90-degree bends, one each in the plane of the long and the short sides of the rectangle. The exterior layer 11 of nickel is the only part which is visible except at the open end where the silver lining 12 is visible. In Fig. 2 the nickel wall 11 and silver lining 12 are shown in their correct relationship except that the actual thickness of both and the relative thickness of the silver lining are exaggerated so that the multi-layer structure may be clearly seen. It is noted that the thickness of both silver lining and nickel wall is somewhat greater at the corners of the cross section (the edges of the three dimensional body) than on the sides (the faces of the three dimensional body) as and for the reasons already set forth.

The production of the wave guide as illustrated in Figs. 1 and 2 will be made more clear by examination of Fig. 3, which illustrates, in greatly enlarged cross section, one corner of an acid soluble core 13 which may be considered to be formed of a zinc base die casting alloy. The alloy advantageously does not contain copper in any significant amount since copper in the alloy tends to retard the solution of the core. On top of the polished surface of core 13 is in the thin layer 14 (greatly exaggerated in thickness in the drawing in order to make it plainly visible) of copper, the surface of which is either brightly polished or deposited as a bright electroplate requiring no further polishing. On top of this is the silver lining 12 (usually specified to be about 0.0005 inch in thickness, which is also greatly exaggerated in the drawing). The greater thickness of this lining along the edges, indicated at 15, is the reverse of the condition which obtains where the silver